(12) United States Patent
Numata et al.

(10) Patent No.: US 7,313,309 B2
(45) Date of Patent: Dec. 25, 2007

(54) OPTICAL DEVICE AND COLOR DISPLAY UNIT USING THE OPTICAL DEVICE

(75) Inventors: Hidetoshi Numata, Yamato (JP); Yoichi Taira, Tokyo-to (JP); Kuniami Sueoka, Sagamihara (JP)

(73) Assignee: Lenovo Singapore Pte. Ltd, Singapore (SG)

( * ) Notice: Subject to any disclaimer, the term of this patent is extended or adjusted under 35 U.S.C. 154(b) by 579 days.

(21) Appl. No.: 11/016,268

(22) Filed: Dec. 17, 2004

(65) Prior Publication Data

US 2006/0007302 A1 Jan. 12, 2006

(30) Foreign Application Priority Data

Dec. 19, 2003 (JP) ............................. 2003-422592

(51) Int. Cl.
*G02B 6/10* (2006.01)
*G02B 5/02* (2006.01)
*G02F 1/1335* (2006.01)

(52) U.S. Cl. ............... 385/130; 385/129; 385/131; 385/14; 385/901; 385/36; 349/64; 349/61; 349/62; 359/599; 359/640; 359/738

(58) Field of Classification Search ............... 385/129, 385/130, 131, 14, 901, 36; 359/599, 640, 359/738; 349/59, 60, 61, 62, 63, 64, 201, 349/202
See application file for complete search history.

(56) References Cited

U.S. PATENT DOCUMENTS 6,751,023 B2 * 6/2004 Umemoto et al. .......... 359/599
7,074,463 B2 * 7/2006 Jones et al. ................ 428/1.1
7,179,513 B2 * 2/2007 Jones et al. ................ 428/1.5
2001/0012159 A1 * 8/2001 Umemoto et al. .......... 359/599

OTHER PUBLICATIONS

Japanese Publication No. 2000-241812 published on Sep. 8, 2000.
Japanese Publication No. 2000-056105 published on Feb. 25, 2000.
Japanese Publication No. 09-127331 published on May 16, 1997.
Japanese Publication No. 2000-084995 published on Mar. 28, 2000.

* cited by examiner

*Primary Examiner*—Brian M. Healy
(74) *Attorney, Agent, or Firm*—Carlos Munoz-Bustamante

(57) ABSTRACT

Optical device and color display unit to correct an angle of visibility, emphasize front brightness or diffusion degree, improve brightness and the performance of angle of visibility, and moreover improve the performance of chromaticity. An optical device is a film-like optical device for angle-correcting light toward a predetermined direction and of two materials whose refractive index difference is at least 0.1 or over, formed so that one material constitutes a plurality of light guide paths having total reflection at the boundary with the adjacent other material, in which the light guide paths are formed so that they are not arranged at equal intervals or they have different cross sections from each other and the ratio of the width or diameter of the light input portion of each of the light guide paths to the film thickness of an optical device is at least 1:10 or more.

16 Claims, 10 Drawing Sheets

OPTICAL DEVICE AND COLOR DISPLAY UNIT USING THE OPTICAL DEVICE

FIELD OF THE INVENTION

The present invention relates to an optical device for providing angle correction to a predetermined direction and a color display unit using the optical device.

BACKGROUND ART

A color liquid-crystal display unit is constituted by from several hundreds of thousands of pixels to several millions of pixels and each pixel is constituted by subpixels of three primary colors (RGB) of red, green, and blue. The liquid-crystal color display unit is divided into a color filter liquid-crystal display unit using color filters of RGB in order to display RGB every subpixel and a color-filterless liquid-crystal display unit not using color filters.

The following documents are considered:
 [Patent Document 1] Published Unexamined Patent Application No. 2000-241812
 [Patent Document 2] Published Unexamined Patent Application No. 9-127331
 [Patent Document 3] Published Unexamined Patent Application No. 2000-56105
 [Patent Document 4] Published Unexamined Patent Application No. 2000-84995

FIG. 19 shows a color-filterless liquid-crystal display unit (refer to Patent Document 1). The display unit shown in FIG. 19 is constituted by a linear or planar light source 100, a wedge-shaped light guide plate 101 into which the light emitted from the light source 100 comes, wavelength dividing means 102 for dividing the light emitted from the wedge-shaped light guide plate 101 in the diagonal direction and almost in parallel into lights of a plurality of wavelength regions, condensing means 103 for condensing the lights divided by the wavelength dividing means 102, a liquid-crystal layer 104 capable of controlling a transmissivitiy every subpixel, and a polarization film 105. The display unit shown in FIG. 19 is further provided with a diffusion plate 106 and a reflection sheet 107.

The light emitted from the linear or planar light source enters the wedge-shaped light guide plate 101 and its angle gradually becomes steeper while repeating reflection at the downside and upside of the wedge-shaped light guide plate 101. When the direction of the light exceeds a critical angle at the upside of the wedge-shaped light guide plate 101, the light is emitted at the upside. Because the light is not emitted before the direction of the light exceeds the critical angle, the light is almost parallel light. The light is divided into RGB lights by the wavelength dividing means 102. The divided RGB lights enter the condensing means 103. The condensing means 103 forms a periodic structure and a structure for one period corresponds to one pixel. In the case of the light entering the condensing means 103, red light enters a subpixel R of, green light enters a subpixel G of, and blue light enters a subpixel B of the liquid-crystal layer 104 and transmission or cutoff of light is controlled every subpixel.

In the case of the display unit shown in FIG. 19, diffracted lights of three colors of RGB are emitted at an angle in which blue light and red light are almost bilaterally symmetric centering around green light. Moreover, in the liquid-crystal layer 104, the diffracted lights are entered into openings of subpixels corresponding to each color in a state condensed with the positional translation according to an incident angle by the condensing means 103 having a period corresponding to openings of three subpixels of RGB constituting one pixel. By driving the liquid-crystal layer 104 corresponding to individual subpixel and thereby modulating the intensity of transmitted light, it is possible to display a desired color image. It is possible to perform light diffusion correction and visual field angle correction on the surface of the liquid-crystal layer 104 by using a light diffusion film or transmission-type diffraction-grating film in order to widen a visual field for lights of three wavelengths having different exit angles emitted from the liquid-crystal layer 104 because of a diffraction angle depending on a wavelength. Also in the case of a color-filterless liquid-crystal projection apparatus, because light is separated from a white light source by wavelength dividing means such as a dichroic mirror or diffraction grating and enters a liquid-crystal layer while condensed by condensing means, each light has incident angle conditions in which angles of lights of colors of RGB are different as in the above mentioned apparatus.

In the case of the above described conventional display unit, incident angles of RGB components inputted to openings of three subpixels of RGB are different and angle distributions of lights outputted from subpixels do not coincide with each other in RGB. Therefore, there is a problem that a change of color balances easily occurs depending on a view point for observation. As a result, the liquid-crystal projection apparatus has problems that color mixing occurs, an image is blurred, and the color reproducibility and resolution are deteriorated. Therefore, it is difficult to provide a color image display unit having a large screen.

Moreover, though the above-described light diffusion film scatters and diffuses light to make it possible to obtain an uniform brightness, only the light is obtained which holds the light intensity center even after an liquid-crystal layer exit angle depending on a wavelength passes through the light diffusion film. Therefore, there is a problem that it is difficult to widely secure an angle of visibility superior in color reproducibility and having a uniform color balance.

It is possible to use a transmission-type blazed grating film having a triangular sectional shape by which a high diffraction efficiency can be obtained as a visibility-angle correcting function member. However, there is a problem that it is difficult to design a film for controlling a diffraction efficiency depending on a wavelength and accurately correcting the incoming light angle of every wavelength to an equivalent visibility-angle distribution.

The color reproducibility in the front direction when using a color-filterless direct-viewing liquid-crystal display unit together with the transmission-type diffraction grating film is 38% in the NTSC (video signal system of a generally used television) ratio, which is lower than 42% of a 13.3-type color-filter direct-viewing liquid-crystal display unit. Moreover, when defining condition of angle of visibility in which the chromaticity can be regarded to be uniform as a range in which an error with a front-directional output light component is kept within 0.02 for both chromaticity coordinates x and y (that is, both x coordinate value and y coordinate value in a chromaticity diagram), an exit angle range satisfying the above condition is a narrow range between about −5° and about 7°. Moreover, in the case of the peak value of the brightness in the front direction, the brightness value in the front direction when not using a diffraction grating film is 217 cd/m$^2$ but the brightness value after adding the film is 85 cd/m$^2$ which is attenuated to 40% or lower. Therefore, the transmission-type blazed grating film has a problem that it does not carry out a sufficient visibility-angle correcting function in brightness and chromaticity.

In view of the above problem, by appropriating an optical filter having a multilayer structure obtained by alternately repeating two types of polymer layers formed by applying a linear ultraviolet radiation to a film-like body constituted by two types of ultraviolet curing polymers having different refractive indexes and using that anisotropy is shown at the time of photopolymerization curing with phase separation to a color-filterless liquid-crystal display unit, it is also considered to provide a visibility-angle correcting function (refer to Patent Document 2).

However, because the multilayer structure of the optical filter obtained by alternately repeating two types of polymer layers is formed in a photopolymerization curing process, the optical filter has a problem that it is impossible to form the structure by optionally controlling the sectional shape of each polymer layer, interval between the polymer layers, and tilt angles of the polymer layers and form a structure having a sufficient accuracy necessary for the above visibility-angle control. Moreover, because the difference between refractive indexes of two types of polymers is as small as about 0.02 (about 0.04 even at the maximum), a visibility-angle correction limit under the total reflection condition when using a high-refractive-index polymer layer as a light guide path ranges between −15° and 15° in air and ranges between −20° and 20° even at the maximum. Therefore, there are problems that a correction angle is small and a correction effect is not sufficient. In the case of an optical filter, it is intended to improve the diffusion capacity by almost uniforming a periodic interval for forming two types of polymer layers to set the periodic interval to a short periodic interval of about 2 μm and thereby using a diffraction effect. However, as described above, because it is impossible to perform a sufficient structure control, the diffraction effect is actually hardly obtained and the diffusion capacity is almost decided in accordance with the difference between refractive indexes of polymers.

Moreover, a one-dimensional or two-dimensional periodic-structural device is proposed which is provided with a pillar member having a light transmission characteristic and a pillar member having a light diffusion characteristic (refer to Patent Document 3). In the case of the device, the arrangement period of pillar members arranged at equal intervals ranges between 50 and 150 μm and the aspect ratio which is the ratio of the width of each pillar member to the thickness of the device is 1:1. Therefore, it is possible to convert diffused light into a mixed output light of transmitted light and diffused light and moderate that a displayed image is blurred due to contrast deterioration or diffusion caused by external light reflection. However, because the device has only a general diffusion function, there are problems that diffused light is only added to the circumference of the exit angle of non-diffusion transmitted light but it is impossible to provide correction of angle of visibility and improve the wavelength dependency of an exit angle distribution which depends on a wavelength.

Moreover, as another device, a structure is proposed in which pillar members of resins having low transmissivity or different refractive indexes are formed in a transparent film periodically, that is, at equal intervals and moreover a diffusion layer is added (refer to Patent Document 4). In the case of this device, the period is about 300 μm and the height of a pillar member ranges between 1 and 1.5 mm. The device has features of electively emitting only the light in a certain angle range and excluding moiré fringes produced between an image display unit and the device by a diffusion layer.

However, the device selectively transmits only an input light component in a certain angle range corresponding to a tilt angle of a pillar member without angle-converting it but it does not have an angle correction function. Therefore, in the case of a color-filterless liquid-crystal display unit, an optical filter is requested which has optimum visibility-angle correction and diffusion function for a request for correction of angle of visibility.

SUMMARY OF THE INVENTION

The present invention solves these problems and provides an optical device and a color display unit making it possible to emphasize correction of angle of visibility and front brightness and thereby improve performances of brightness and angle of visibility and moreover improve the performance of chromaticity.

An optical device and a color display unit are Providing in the present invention. That is, the present invention provides a film-like optical device for angle-correcting light in a predetermined direction, wherein the optical device is constituted by two materials whose refractive index difference is at least 0.1, one material constitutes a plurality of light guide paths having total reflection at the boundary with the adjacent other material, and the light guide paths are formed so that they are not arranged at equal intervals or they have widths or diameters different from each other and the ratio of the width or diameter of the light input portion of each of the light guide paths to the film thickness of the optical device is at least 1:10.

According to the present invention, it is advantageous that:

the boundary tilts from the predetermined direction;

a plurality of boundaries formed by the light guide paths tilt from the predetermined direction at a plurality of tilt angles correspondingly to the incident angle range of input light.

the incident angle ranges between −30° and 30° from the predetermined direction in air and the tilt angles ranges between −10° and 10° from the predetermined direction.

widths or diameters of the light guide paths are formed so that they are not arranged at equal intervals in a range of 1 to 20 μm.

it is possible to set a mask to the light input portion of the other material adjacent to the light guide paths in order to cut off, reflect, or absorb the light inputted to the other material.

the light guide paths are formed as a layer or pillar.

the light guide paths may be formed so that the area of the light input portion of each of the light guide paths is larger or smaller than the area of the light output portion of each of the light guide paths.

The present invention provides a color display unit including a light source, a wedge-shaped light guide plate into which the light emitted from the light source comes, wavelength dividing means for dividing the light emitted from the wedge-shaped light guide plate into lights of a plurality of wavelength regions, condensing means for receiving the lights divided by the wavelength dividing means and condensing the light in a predetermined wavelength region into a predetermined subpixel, a liquid-crystal layer making it possible to control transmission or cutoff of light every subpixel, and a film-like optical device for angle-correcting the light emitted from the liquid-crystal layer in a predetermined direction, in which the optical device is constituted by two materials whose refractive index difference is at least 0.1, one material constitutes a plurality of light guide paths having total reflection at the boundary with the adjacent other material, and the light guide paths are formed so that they are not arranged at equal intervals or they have widths or diameters different from each other and the ratio of the width or diameter of the light input portion of each of the light guide paths to the film thickness of the optical device is at least 1:10.

DETAILED DESCRIPTION OF THE INVENTION

Figure 1:
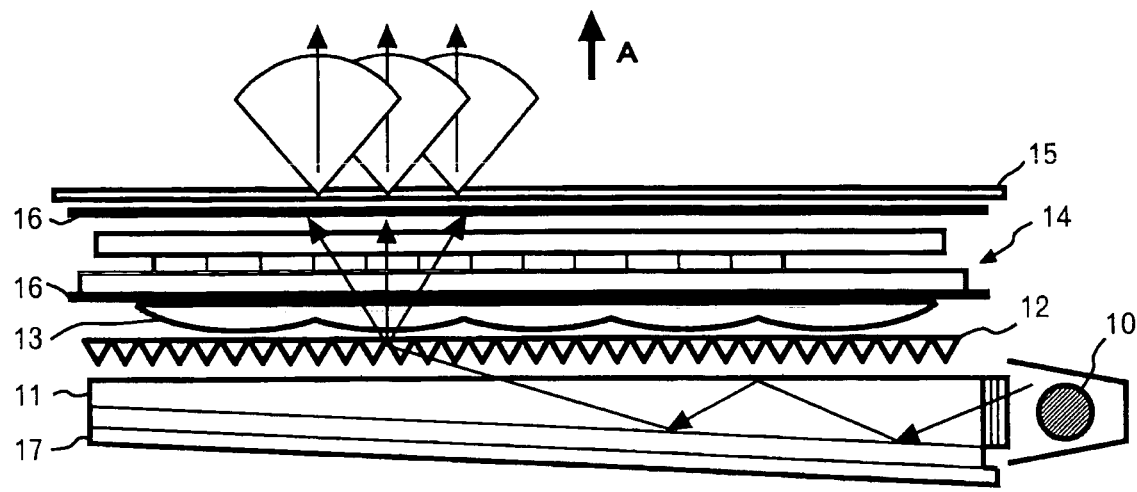
FIG. 1 is a sectional view showing a color display unit of the present invention.

The present invention provides an optical device and a color display unit making it possible to emphasize correction of angle of visibility and front brightness and thereby improve performances of brightness and angle of visibility and moreover improve the performance of chromaticity. This is achieved by providing an optical device and a color display unit. That is, the present invention provides a film-like optical device for angle-correcting light in a predetermined direction, wherein the optical device is constituted by two materials whose refractive index difference is at least 0.1, one material constitutes a plurality of light guide paths having total reflection at the boundary with the adjacent other material, and the light guide paths are formed so that they are not arranged at equal intervals or they have widths or diameters different from each other and the ratio of the width or diameter of the light input portion of each of the light guide paths to the film thickness of the optical device is at least 1:10.

According to the present invention, it is advantageous that the boundary tilts from the predetermined direction. It is advantageous that a plurality of boundaries formed by the light guide paths tilt from the predetermined direction at a plurality of tilt angles correspondingly to the incident angle range of input light. It is advantageous that the incident angle ranges between −30° and 30° from the predetermined direction in air and the tilt angles ranges between −10° and 10° from the predetermined direction. It is advantageous that widths or diameters of the light guide paths are formed so that they are not arranged at equal intervals in a range of 1 to 20 μm. It is advantageous in that it is possible to set a mask to the light input portion of the other material adjacent to the light guide paths in order to cut off, reflect, or absorb the light inputted to the other material. It is advantageous that the light guide paths are formed as a layer or pillar. It is advantageous that the light guide paths may be formed so that the area of the light input portion of each of the light guide paths is larger or smaller than the area of the light output portion of each of the light guide paths.

The present invention provides a color display unit including a light source, a wedge-shaped light guide plate into which the light emitted from the light source comes, wavelength dividing means for dividing the light emitted from the wedge-shaped light guide plate into lights of a plurality of wavelength regions, condensing means for receiving the lights divided by the wavelength dividing means and condensing the light in a predetermined wavelength region into a predetermined subpixel, a liquid-crystal layer making it possible to control transmission or cutoff of light every subpixel, and a film-like optical device for angle-correcting the light emitted from the liquid-crystal layer in a predetermined direction.

By providing an optical device of the present invention, it is possible to provide an extensive color reproducibility, wide angle of visibility, and clear displayed image. Moreover, by providing a color display unit using an optical device of the present invention, it is possible to improve the color reproducibility in the front direction, provide a symmetrical and extensive angle of visibility centering around the front direction, and obtain a high-brightness and uniform chromaticity output light distribution.

The present invention is described below with specific embodiments shown in the accompanying drawings. However, the present invention is not restricted to the embodiments to described herein.

Figure 19:
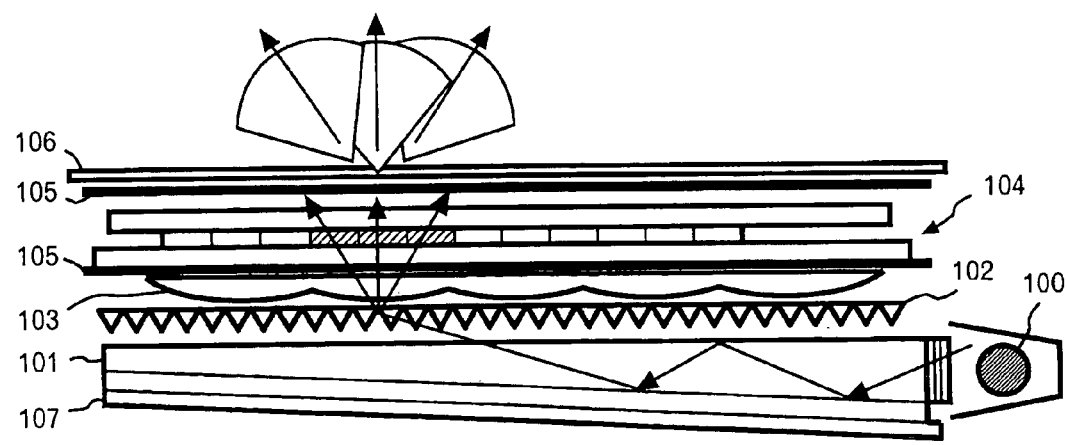
FIG. 19 shows a color-filterless liquid-crystal display unit.

FIG. 1 is a sectional view showing a color display unit of the present invention. The color display unit shown in FIG. 1 is the conventional display unit shown in FIG. 19 provided with an optical device of the present invention The display unit shown in FIG. 1 is a linear or planar light source 10, a wedge-shaped light guide plate 11 into which the light emitted from the light source 10 comes, wavelength dividing means 12 for dividing the light emitted from the wedge-shaped light guide plate 11 in a diagonal direction and almost in parallel into lights of a plurality of wavelength regions, condensing means 13 for condensing the lights divided by the wavelength dividing means 12, a liquid-crystal layer 14 making it possible to control transmission or cutoff of light every subpixel, and a film-like optical device 15 for angle-correcting the light emitted from the liquid-crystal layer 14 in a predetermined direction. Moreover, the display unit shown in FIG. 1 is provided with a polarization film 16 and a reflective sheet 17.

A fluorescent lamp can be used as the light source 10 shown in FIG. 1 and a microlens array such as a cylindrical lens array can be used as the condensing means 13. Moreover, a plate in which light regularly reflects at a face opposite to the light output face can be used as the wedge-shaped light guide plate 11. Furthermore, a diffraction grating can be used as the wavelength dividing means 12.

As described above, the light emitted from the linear or planar light source 10 enters the wedge-shaped light guide plate 11 and the angle of the light gradually becomes steeper while repeating reflection at the downside and the upside of the wedge-shaped light guide plate 11. When the direction of the light at the upside exceeds a critical angle, light is emitted at the upside of the wedge-shaped light guide plate 11. Because the light is emitted for the first time by exceeding the critical angle, the light becomes almost parallel light. The light is divided into lights of RGB at the wavelength dividing means 12. The divided RGB lights enter the condensing means 13. The condensing means 13 forms a periodic structure and a structure for one period corresponds to one pixel. In the case of the light entering the condensing means 13, read light enters the subpixel R of, green light enters the subpixel G of, and blue light enters the subpixel B of the liquid-crystal layer 14 and transmission or cutoff of light is controlled every subpixel.

In the case of the display unit shown in FIG. 1, diffracted lights of three colors of RGB are emitted at angles at which blue light and red light are almost bilaterally symmetric centering around green light. Moreover, in the liquid-crystal layer 14, the diffracted lights are made to enter the liquid-crystal layer 14 by the condensing means 13 having a period corresponding to openings of three subpixels of RGB constituting one pixel while condensed in the opening of a subpixel corresponding to each color with the positional translation corresponding to a incident angle. Furthermore, the light passing through the liquid-crystal layer 14 enters the optical device 15 while holding a incident angle. The optical device 15 performs the angle correction of input light to align the input light in an angle range centering around the front direction shown by the arrow A. Thereby, as shown in FIG. 1, it is possible to complete lights of colors of RGB and emit them centering around the front direction shown by the arrow A. An optical device of the present invention is described by referring to FIG. 2.

FIGS. 2 to 12 are sectional views showing an optical device of the present invention. The optical device 15 of the present invention is film-like, constituted by two materials 20 and 21 whose refraction index difference is at least 0.1, one material 20 constitutes a plurality of light guide paths 22 having total reflection at the boundary with the adjacent other material 21. One material 20 is a material having a high refractive index and is hereafter described as a high-refractive-index material. Moreover, the other material 21 is a material having a low refractive index and is described as a low-refractive-index material. A plurality of light guide paths 22 are formed so that they are not arranged at equal intervals or they have widths or diameters different from each other. Moreover, in the case of the present invention, the ratio of the width or diameter of the light input portion of each of the light guide paths 22 to the film thickness of the optical device 15 (hereafter referred to as aspect ratio) is at least 1:10. In this case, the width or diameter denotes the width or diameter of the cross section of each of the light guide paths 22 viewed from the light input side through which light comes in or light output side through which light goes out. For example, for a layer, the width or diameter denotes the thickness of the layer, for a rectangle, the width or diameter denotes the length of the major side of the rectangle, and for a circle, the width or diameter denotes the diameter of the circle.

In the case of the optical device 15 of the present invention, internal total reflection of the light guide paths 22 constituted by the high-refractive-index material 20 occurs once or several times at the boundary where the high-refractive-index material 20 and the low-refractive-index material 21 are adjacent to each other and light is emitted through the total reflection. Thereby, angle correction is performed in the above front direction. To totally reflect the light having a large angle in the front direction, the difference between refractive indexes of the high-refractive-index material 20 and low-refractive-index material 21 must be increased. Moreover, to totally reflect the light at least once, the aspect ratio must be increased. As describe below, an optical device of the present invention emits the light in a predetermined range by angle-correcting the light in the front direction which is a predetermined direction.

Therefore, the difference between refractive indexes is set to at least 0.1 or over and the aspect ratio is set to 1:10 or more. Moreover, an optical device of the present invention does not have a structure in which the high-refractive-index material 20 and the low-refractive-index material 21 are periodically repeated, that is, the light guide paths 22 are arranged at equal intervals and have the same width or diameter. Therefore, it is possible to prevent a moiré phenomenon which may occur between liquid-crystal cells of the liquid-crystal layer 14 and the optical device 15. The moiré phenomenon is a periodic pattern caused by the interference between periodic image components. Moreover, because the optical device 15 of the present invention does not have a periodic repetitive structure, it is possible to prevent a group of diffracted lights having a plurality of discrete angles from being emitted in accordance with the mutual interference between lights emitted from the light guide paths 22. As described above, the optical device 15 of the present invention does not have a periodic repetitive structure but it has a non-periodic structure. Therefore, it is possible to easily form a continuous output light distribution and prevent a color division phenomenon.

Figure 2:
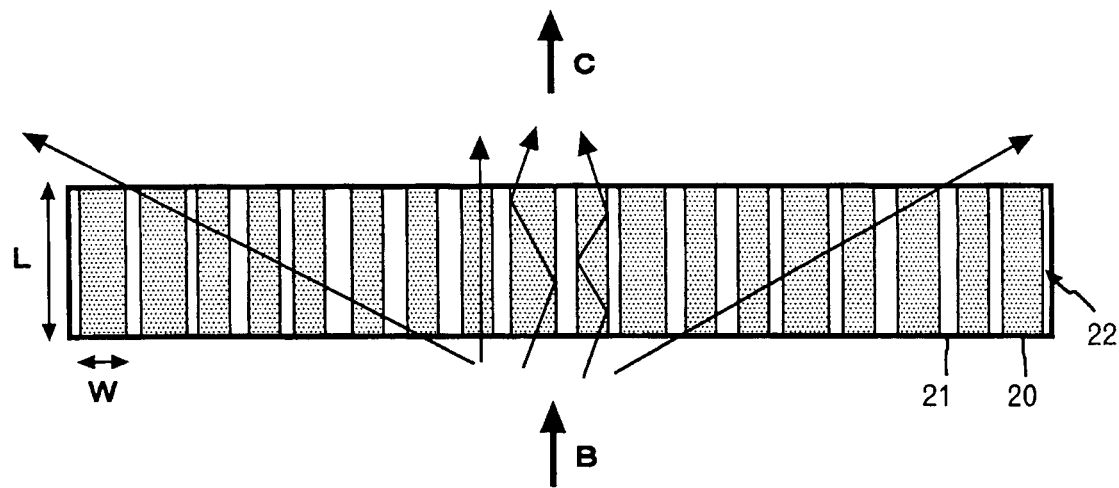
FIG. 2 is a sectional view showing a first embodiment of the invention.

FIG. 2 is a sectional view showing first embodiment of an optical device of the present invention. The optical device 15 shown in FIG. 2 has a structure in which the high-refractive-index material 20 and low-refractive-index material 21 are respectively formed as a layer and alternately repeated at the cross section of the optical device 15 shown in FIG. 2. Moreover, each boundary where two material layers are adjacent to each other is parallel with the normal direction of the surface of the optical device 15. Moreover, the optical device 15 is formed so that thicknesses of or the interval between the layer of the high-refractive-index material 20 and the layer of the low-refractive-index material 21 is respectively different. Thereby, in the case of the sectional view shown in FIG. 2, periods of alternately repetitive structures of layers are random and it is possible to prevent a moiré phenomenon in which the light emitted through the optical device 15 forms a periodic pattern from occurring. The light comes in from the direction shown by the arrow B, passes through each layer, and is emitted in the direction shown in the arrow C. Therefore, each layer constitutes a light guide path. Moreover, the light guide path formed by the high-refractive-index material 20 accompanies total reflection at the boundary with the adjacent low-refractive-index material 21 and angle correction is performed. The embodiment shown in FIG. 2 shows a case in which total reflection occurs in the light guide paths 22. Moreover, the light input at an angle at which total reflection does not occur is emitted at the original angle by passing through the high-refractive-index material 20 and low-refractive-index material 21 as shown in FIG. 2.

Moreover, in the case of the present invention, as described above, the aspect ratio which is a ratio of the width or diameter W of the light input portion of the high-refractive-index material 20 into which input light comes to the film thickness L of the optical device 15 is at least 1:10 or more. The above aspect ratio is necessary because lights of RGB input to the medium of the optical device 15 have tilts of about 6° (about 9° in air) and about −6° (about −9° in air) from the normal direction in peak components of red and blue lights in a color display unit in order to totally reflect these lights at least once. Moreover, the aspect ratio is a ratio also applied when the tilt of the boundary described below is properly set. When the width or diameter W of the light input portion is 10 μm, the film thickness L is 100 μm or more. When a incident angle is small, for example, 3°, it is possible to increase the aspect ratio in order to perform total reflection at least once. When applying the design that the light guide paths 22 have widths or diameters different from each other, an aspect ratio is decided by using the width or diameter W of the light input portion of the light guide path 22 having the maximum width or diameter.

Any one of the following materials can be used for the present invention: polycarbonate resin, propylene resin, ABS (acrylonitrile butadiene styrene) resin, polytetrafluoroethylene, fluorocarbon resin such as polytetrafluoroethylene, phenoxy resin, polystyrene resin, MS (metacrylic styrene) resin, polyester resin such as polyethylene terephthalate or polybutylene terephthalate, acrylic resin such as polymetacrilate, epoxy resin, polyvinyl chloride, polyvinylidene chloride, polyamide, polymethylpentene, allyl resin, silicon elastomer, $Ta_2O_5$, TiO, $TiO_2$, $Ti_3O_5$, $HfO_2$, $ZrO_2$, $Nb_2O_5$, $MgF_2$, and $SiO_2$. In the case of the present invention, materials are not restricted to the above materials. Any material can be used as long as it is transparent.

Refractive indexes are specifically shown below.

Photosensitive epoxy resin has a refractive index of 1.67, silicon elastomer has a refractive index of 1.42, $Ta_2O_5$ has a refractive index of 2.1, TiO has a refractive index of 2.3 to 2.55, $TiO_2$ has a refractive index of 2.3 to 2.55, $HfO_2$ has a refractive index o 1.95, $MgF_2$ has a refractive index of 1.38 to 1.4, $SiO_2$ has a refractive index of 1.45, metacrylic resin (PMMA) has a refractive index of 1.49, polycarbonate has a refractive index of 1.58 to 1.59, polystyrene has a refractive index of 1.59 to 1.60, acrylic resin has a refractive index of 1.48 to 1.50, MS resin has a refractive index of 1.56 to 1.58, polyvinylchloride has a refractive index of 1.52 to 1.55, and polyvinlydene chloride has a refractive index of 1.63. The present invention can use a combination in which the difference between refractive indexes is 0.1 or over. For example, it is possible to use an photosensitive epoxy resin having a refractive index of 1.67 as the high-refractive-index material 20 and silicon elastomer having a refractive index of 1.42 as the low-refractive-index material 21. As described above, it is allowed to use any combination as long as the difference between refractive indexes is 0.1 or more and moreover, it is possible to use materials other than the above by combining them. In the case of the present invention, it is possible to manufacture the high-refractive-index material 20 by adding a material having a high refractive index such as the above $TiO_2$ or $ZrO_2$ to a polymer.

Figure 3:
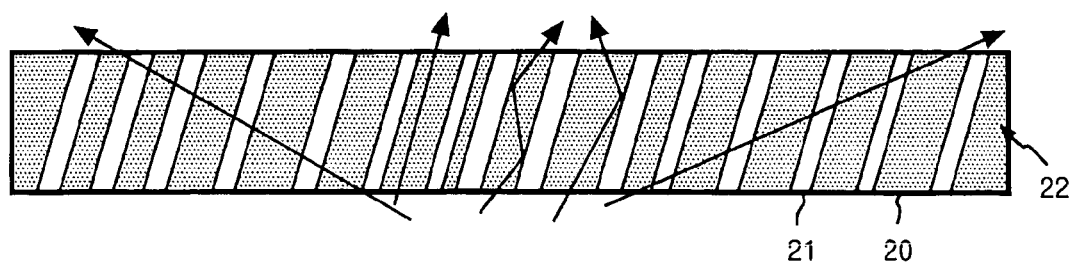
FIG. 3 is a sectional view showing a second embodiment of the invention.

FIG. 3 is a sectional view showing second embodiment of the optical device 15 of the present invention. The embodiment shown in FIG. 3 is formed as a layer in which the high-refractive-index material 20 and low-refractive-index material 21 are alternately repeated and which is a structure in which boundaries formed by two layers have an optional tilt from the normal direction. The boundaries are parallel with each other and thicknesses of or interval between the layers are random in order to prevent the above moiré phenomenon as in FIG. 2. In the case of this embodiment, it is possible to perform angle correction for a symmetric output light distribution centering around a tilt angle completed to an optional angle in each boundary. Moreover, as described above, at least a proper aspect ratio of 1:10 or more can be used as that the input light entering the high-refractive-index material 20 is totally reflected at the boundary between the high-refractive-index material 20 and the low-refractive-index material 21.

Figure 4:
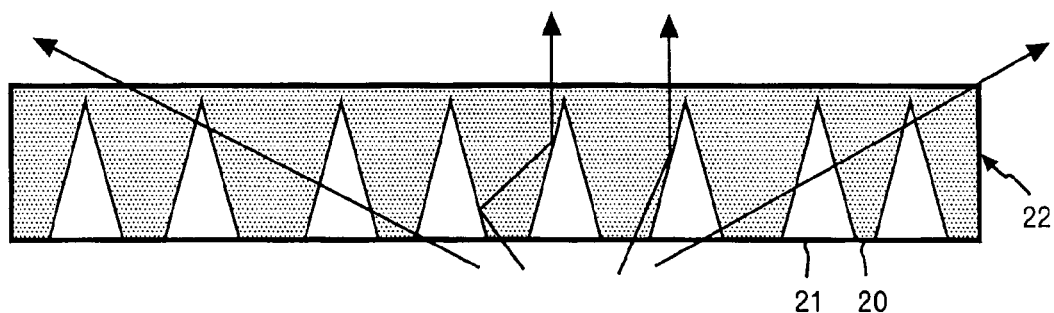
FIG. 4 is a sectional view showing a third embodiment of the invention using optional positive and negative angles.

FIG. 4 is a sectional view showing third embodiment of the optical device 15 of the present invention. The embodiment shown in FIG. 4 uses a structure in which an optional positive angle and an optional negative angle are alternately arranged from the normal direction at the boundary between the layer of the high-refractive-index material 20 and the layer of the low-refractive-index material 21. When noticing only the layer of the high-refractive-index material 20, it is wedge-shaped, that is, V-shaped. Moreover, thicknesses of or intervals between layers are random in order to prevent a moiré phenomenon as in FIGS. 2 and 3. Moreover, layers of the high-refractive-index material 20 are adjacent to each other at the upper portion of the layers of the high-refractive-index material 20, that is, light output side and the light temporarily entering the layers of the low-refractive-index material 21 is finally emitted from the high-refractive-index material 20 as the angle-corrected light. According to this structure, it is possible to angle-correct the light entering the optical device 15 toward the normal direction and emit the light by improving the front brightness. It is possible to set tilts to 3° and −3° when the input light has angles of 6° and −6° from the normal direction in the medium of the optical device 15. Thereby, it is possible to emit red light whose peak component comes in at an angle of 6° toward the normal direction and blue light whose peak component comes in at an angle of −6° toward the normal direction in a color display unit. Also in this case, it is possible to use a proper aspect ratio of at least 1:10 or more in order to totally reflect input light at the boundary between the high-refractive-index material 20 and the low-refractive-index material 21.

Figure 5:
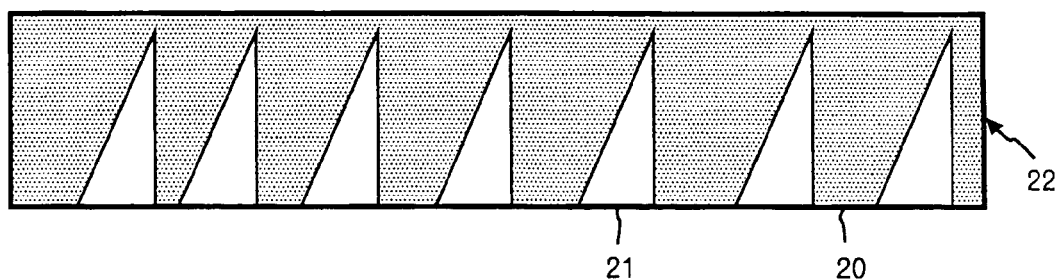
FIG. 5 is a sectional view showing a fourth embodiment of the invention with a boundary layer between high and low index material.

FIG. 5 is a sectional view showing fourth embodiment of the optical device 15 of the present invention. The embodiment shown in FIG. 5 uses a structure in which the boundary between the layer of the high-refractive-index material 20 and the layer of the low-refractive-index material 21 is parallel with the normal direction and is alternately repeated at an optional angle. Moreover, as in FIG. 4, a structure is used in which layers of the high-refractive-index material 20 are adjacent to each other at the upper portion of the layers of the high-refractive-index material 20. In the case of the embodiment shown in FIG. 5, a boundary has an optional positive angle and in the case of a color display unit, it is possible to emit red light inputted with a positive angle toward the normal direction. Blue light inputted with a negative angle can be angle-corrected toward the normal direction into which each light comes by using a structure obtained by mirror reversing the structure in FIG. 5. In the case of the structure shown in FIG. 5, it is possible to increase the proportion of input light entering the layers of the high-refractive-index material 20 because an effective light guide path light input area is large about angle correction toward the normal direction into which each light comes compared to the case of the structure shown in FIG. 4. That is, the influence that most of the light inputted to the layers of the low-refractive-index material 21 does not contribute to angle correction toward the normal direction but it is diffused and emitted can be decreased by decreasing a light input portion into which input light comes in size. Also in this case, it is possible to use a proper aspect ratio of at least 1:10 or more so that input light is totally reflected at a boundary. By using the structures shown in FIGS. 4 and 5, it is possible to improve not only angle correction but also the normal-directional, that is, front-directional brightness.

Figure 6:
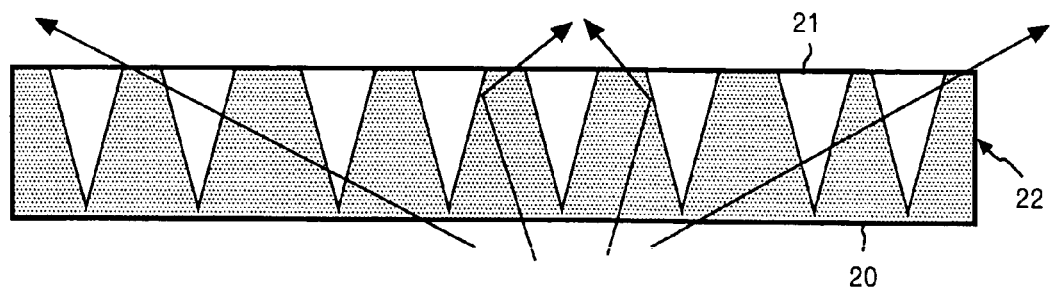
FIG. 6 is a sectional view showing a fifth embodiment of the invention which reverses the top and bottom structures, of FIG. 4.

FIG. 6 is a sectional view showing fifth embodiment of the optical device 15 of the present invention. In the case of the embodiment shown in FIG. 6, a structure is used which is obtained by reversing the top and bottom of the structure shown in FIG. 4. In the case of this structure, it is possible to receive every input light by the high-refractive-index material 20 and totally reflect it at a boundary. In this case, because an incident angle from the normal direction and an angle of a boundary from the normal direction are always opposite in positive and negative sides, the light is emitted with larger total reflection. Thereby, it is possible to improve not only the angle correction effect but also the diffusion effect of output light and obtain a uniform image over a wide angle of visibility.

Figure 7:
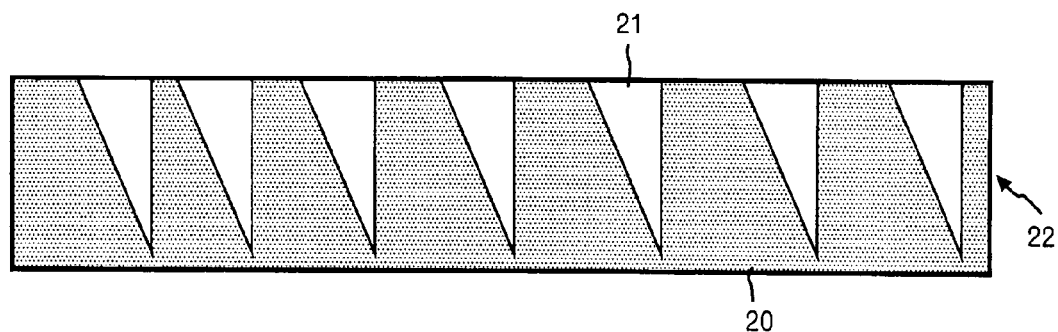
FIG. 7 is a sectional view showing a sixth embodiment of the invention which reverses the top and bottom structures of FIG. 5.

FIG. 7 is a sectional view showing sixth embodiment of the optical device 15 of the present invention. In the case of the embodiment shown in FIG. 7, a structure is used which is obtained by reversing the top and bottom of the structure shown in FIG. 5. In the case of this structure, it is possible to receive every input light by the high-refractive-index material 20 as in FIG. 6 and totally reflect it at a boundary as in FIG. 6. Moreover, in this case, because a boundary having a tilt angle is present only in either side of the high-refractive-index material 20 compared to the case of FIG. 6, light is angle-corrected and emitted without causing multiple reflection as the case of the embodiment shown in FIG. 6. By using the structures shown in FIGS. 6 and 7, it is possible to improve the diffusion effect by diffusion of the above output light simultaneously with angle correction.

Figure 8:
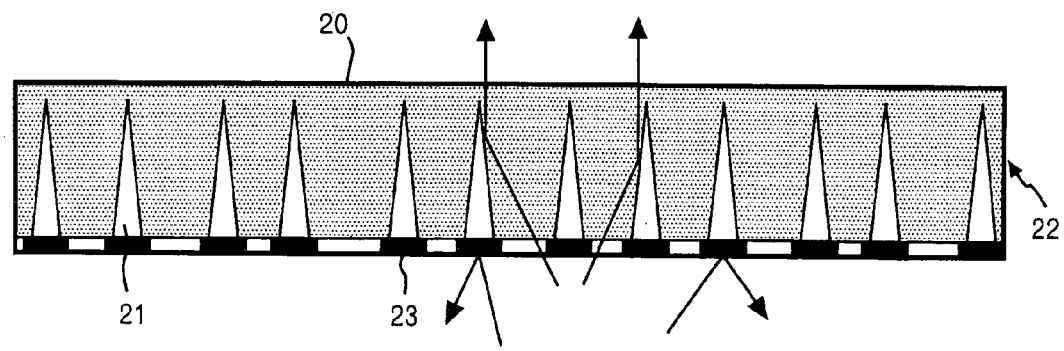
FIG. 8 is a sectional view showing the seventh embodiment of the invention that uses reflective material in the structure of FIG. 4.

FIG. 8 is a sectional view showing seventh embodiment of an optical device of the present invention. The embodiment shown in FIG. 8 has the same structure as that in FIG. 4 and moreover, reflective material 23 is provided in each of the light input portions of the layer of the low-refractive-index material 21 at the light input side. Thereby, the light inputted to the layers of the low-refractive-index material 21 is reflected by the reflective material 23 and only the light inputted to the layers of the high-refractive-index material 20 is angle-corrected and emitted. The present invention can use not only a reflective material but also a light shielding material and light absorption material. Any material can be used as the light absorption material, light shielding material, and reflective material as long as it can absorb, shield, and reflect light. For example, it is possible to use opaque metallic materials such as a polymer material containing carbon black and aluminum.

Figure 9:
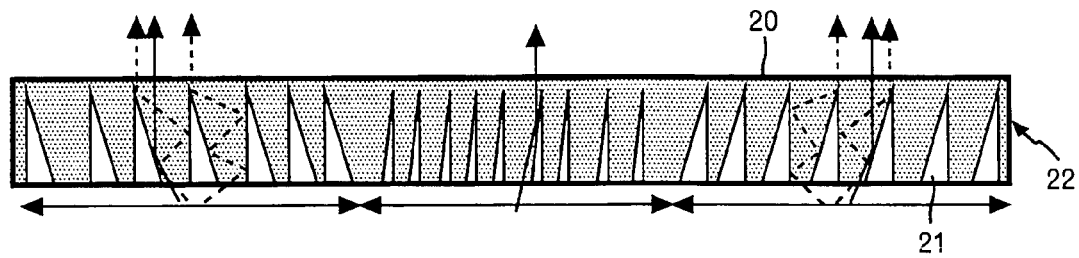
FIG. 9 is a sectional view showing the eighth embodiment of the invention with color adjusted tilt boundaries.

FIG. 9 is a sectional view showing eighth embodiment of an optical device of the present invention. The optical device 15 shown in FIG. 9 has the same structure as the embodiment shown in FIG. 5. In a color display unit, the optical device 15 has a structure in which the tilt of a boundary for blue light is a tilt opposite to the direction of red light in positive and negative sides and the tilt of the boundary is small for green light whose tilt angle of incident light from the normal direction is made smaller than that of red light and blue light in order to emit the green light toward the normal direction. FIG. 9 shows the region of the optical device 15 into which lights of three colors come. Peak components of input light inputted to the medium of the optical device 15 through a liquid-crystal cell in the color display unit, red light is about 6° (about 9° in air) from the normal direction, green light is about 1.4° (about 2° in air) from the normal direction, and blue light is about −6° (about −9° in air) from the normal direction. Therefore, tilts of boundaries corresponding to lights of three colors are about 3°, about 0.7°, and about −3° for red light, green light, and blue light, respectively. In this case, when an aspect ratio is 1:10 or more for red light and blue light, a peak component is totally reflected at least once and angle-corrected. For green light, because a shift of an angle from the normal direction which is a desired direction is small, it is not necessary to angle-correct every input light. However, it is necessary to set the aspect ratio to 1:41 or more in order to totally reflect every input light at least once.

Figure 10:
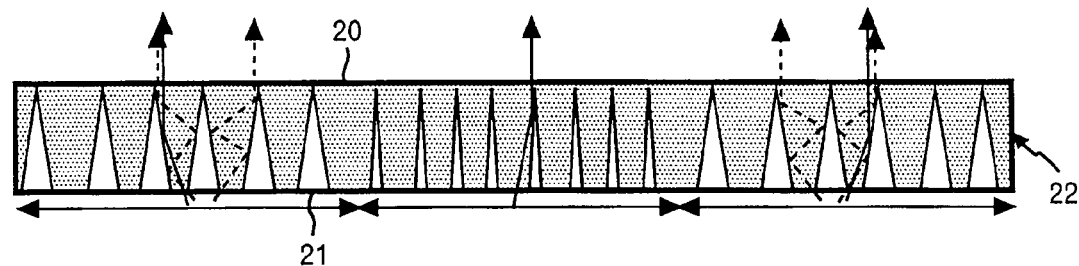
FIG. 10 is a sectional view of the ninth embodiment of the invention with predetermined tilt boundaries.

FIG. 10 is a sectional view of ninth embodiment of an optical device of the present invention. The optical device 15 shown in FIG. 10 has the same structure as the embodiment shown in FIG. 4, in which a predetermined tilt is provided for a boundary in order to correspond to green light in a color display unit. The tilt angle of the tilt from the normal direction is the same as about 0.7° described above. Thus, it is possible to angle-correct the light of any color and properly emit the light in the normal direction which is a desired direction. Therefore, it is possible to reduce diffused light in other direction and further improve the brightness.

For example, in the case of red light and blue light, not only the intensity peak component but also all angle components of lights of three colors inputted to the optical device 15 in accordance with the effect of the condensing means 13 in FIG. 1 expands in a range of about −5° to 25° in air and in a range of about −25° to 5° in air respectively and the green light expands in a range of about −15° to 15° in air. As described above, when keeping tilt angles of 3°, 0.7°, and −3° for red light, green light, and blue light constant in order from the right in FIG. 9 and performing design on the basis of the red light and blue light, an aspect ratio of 1:43 or more is necessary because an output light distribution is kept in a narrow range of −1° to 1° by using the normal direction as the intensity center in the case of the structure of the embodiment shown in FIG. 9 to which the conformation in FIG. 5 is applied and an aspect ratio of 1:23 or more is necessary in the case of the structure of the embodiment shown in FIG. 10 to which the conformation in FIG. 4 is applied. When performing design on the basis of green light, an aspect ratio of 1:118 or more is necessary for the structure of the configuration shown in FIG. 9 to which the conformation in FIG. 5 is applied because the output light distribution is kept in the above narrow range and an aspect ratio of 1:62 or more is necessary for the structure for the embodiment shown in FIG. 10 to which the conformation in FIG. 4 is applied.

Figure 11:
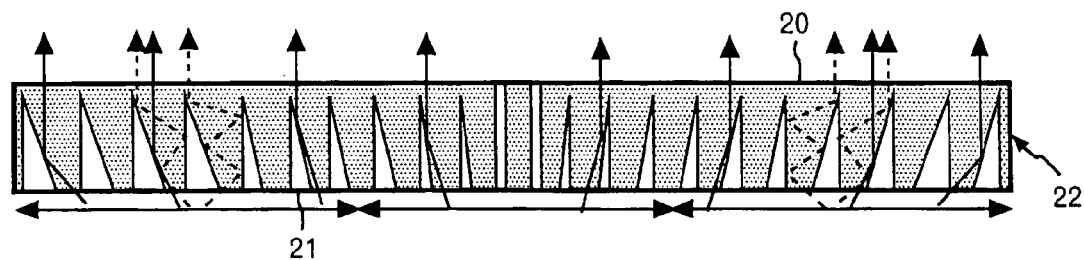
FIG. 11 is a sectional view showing the tenth embodiment of the invention with improved tilt angle, angle correction and brightness.
Figure 12:
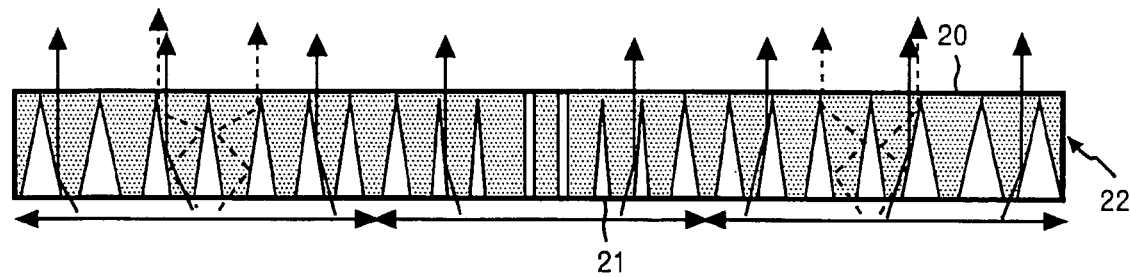
FIG. 12 is a sectional view showing the eleventh embodiment of the invention in which the tilt from a boundary from the normal direction is increased as being separated from the center.

FIGS. 11 and 12 are sectional views showing tenth and eleventh embodiments of an optical device of the present invention. Though tilt angles of boundaries between the high-refractive-index materials 20 and the low-refractive-index materials 21 into which lights of three colors come are constant for lights of three colors in the embodiments shown in FIGS. 9 and 10, the embodiments shown in FIGS. 11 and 12 respectively uses a structure in which tilt angles depend on a position, angle correction is more properly performed, and brightness can be improved. FIG. 11 shows a structure in which the tilt of a boundary from the normal direction is increased as being separated from the center. The embodiment shown in FIG. 11 is obtained by improving the embodiment shown in FIG. 9. FIG. 12 also shows a structure in which the tilt of a boundary from the normal direction is increased as being separated from the center. The embodiment shown in FIG. 12 is obtained by improving the embodiment shown in FIG. 10.

The embodiments shown in FIGS. 11 and 12 respectively have a structure designed considering even wavelength spectral distributions of color lights of red, green, and blue included in the light source 10 in FIG. 1, which is an improved structure capable of providing angle correction and front brightness emphasis at an accuracy higher than those in FIGS. 9 and 10. Angles of tilts of boundaries from the normal direction to red light in a range of about 3° to about 9° (range of about 4.5° to about 13.5° in air) are distributed in a range of about 1.5° to about 4.5° and angles of tilts of boundaries to blue light are distributed in a range of about −1.5° to about −4.5°, and angles of tilts of boundaries to green light in a range of about −3° to about 3° from the normal direction are distributed in a range of about −1.5° to about 1.5°. These tilt angles of boundaries are increased as being separated from the center of all wavelength components expanding bilaterally in order to properly angle-correct the components toward the normal direction in accordance with a difference between wavelength, that is, division angles centering around a wavelength component incident toward the normal direction among lights inputted to the optical device 15 through the condensing means 13 and liquid-crystal cells from the wavelength dividing means 12 in FIG. 1. In this case, to angle-correct intensity peak components of red light and blue light toward the front direction, an aspect ratio of 1:20 or more is sufficient. Moreover, to keep not only the intensity peak components but also all output light distributions of lights of three colors inputted to the optical device 15 in accordance with the effect of the condensing means 13 in FIG. 1 in a narrow range of −1° to 1° by using the normal direction as the intensity center, an aspect ratio of 1:50 or more is sufficient for the structure of the embodiment shown FIG. 11 and an aspect ratio of 1:28 or more is sufficient even for the structure of the embodiment shown in FIG. 12. In the case of the present invention, by distributing tilt angles of boundaries from the normal direction in a range of −10° to 10° for the light whose incident angle range is in a range of −30° to 30° (−20° to 20° in the medium of the optical device 15) in air, it is possible to properly angle-correct all wavelength components expanding bilaterally toward the normal direction.

Figure 13:
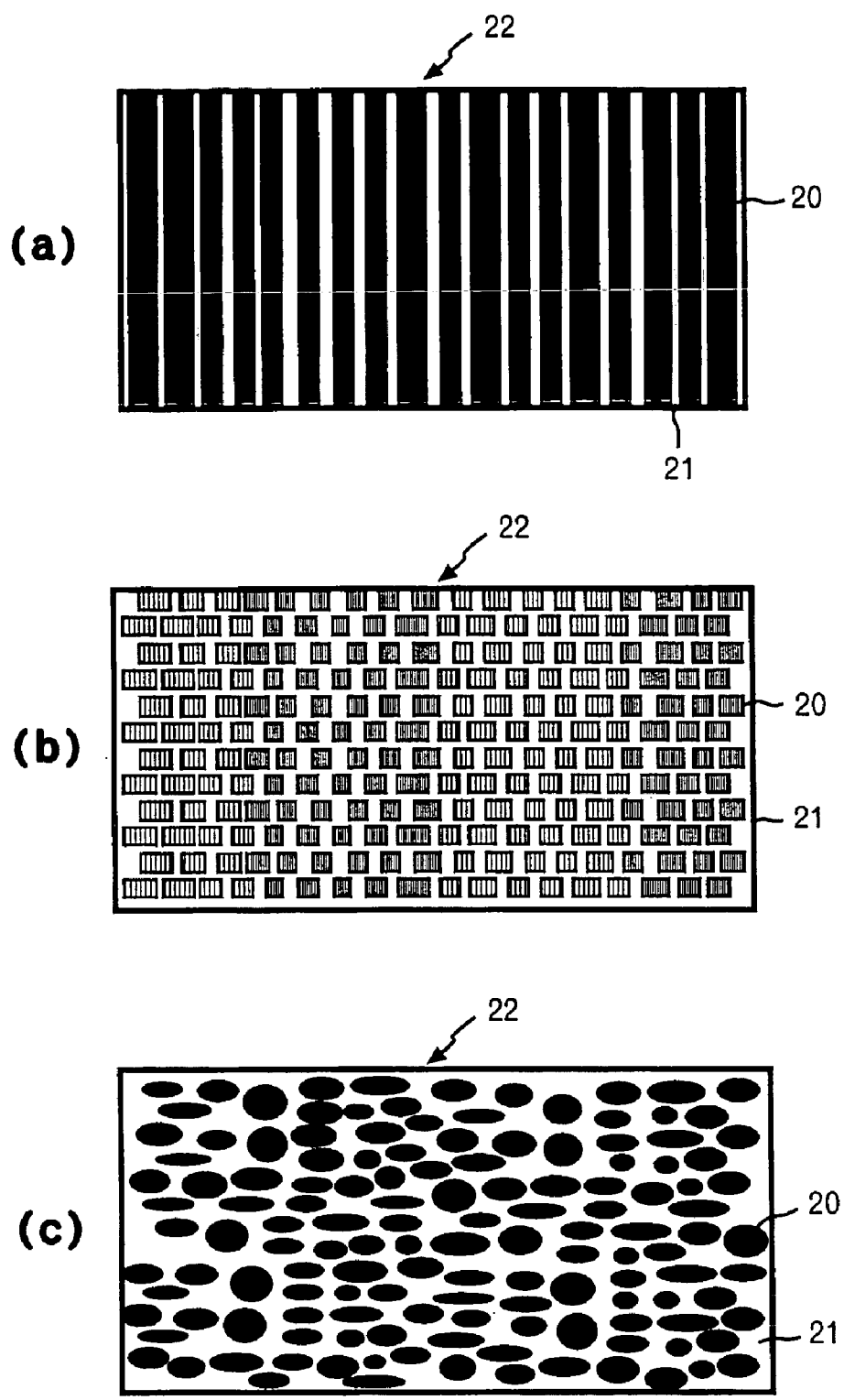
FIGS. 13 (*a*), (*b*), (*c*) are a plan view(s) of the optical device of the present invention that is viewed from the light input or light output side of FIGS. 2-12.

FIG. 13 is a plan view of an optical device of the present invention. This plan view is viewed from the light input side or light output side in sectional views shown in FIGS. 2 to 12. The optical device 15 shown in FIG. 13(a) has a laminated structure in which the high-refractive-index material 20 and low-refractive-index material 21 are alternately laminated. Moreover, to prevent the above-described moiré phenomenon, the optical device 15 is formed so that thicknesses of or intervals between layers are different. The optical device 15, shown in FIG. 13(b) is formed by a structure in which the high-refractive-index materials 20 constituted by a plurality of rectangular parallelepipeds are random so that they are not arranged at equal intervals and the circumference of the high-refractive-index materials 20 are filled with the low-refractive-index materials 21. Because the high-refractive-index materials 20 are not arranged at equal intervals or sectional areas of light guide paths formed by the high-refractive-index materials 20 are respectively different, a periodic pattern is not formed and it is possible to prevent a moiré phenomenon. In the case of the optical device 15 shown in FIG. 13(c), a plurality of high-refractive-index materials 20 constituted by pillars whose cross sections are circular or elliptic are formed at random so that they are not arranged at equal intervals and the circumference of the high-refractive-index material 20 is filled with the low-refractive-index materials 21. Thus, by using a non-periodic array structure, it is possible to prevent a moiré phenomenon. In the case of the present invention, though any value can be used for the interval between the high-refractive-index materials 20 or the width or diameter of the high-refractive-index material 20 unless it can be viewed on a color display unit, it is possible to set the value in a range of 1 to 20 µm. As described above, because the optical device 15 of the present invention must be formed at random so as to be non-periodic, the high-refractive-index materials 20 are formed so that they are not arranged at equal intervals in a range of 1 to 20 µm.

Figure 14:
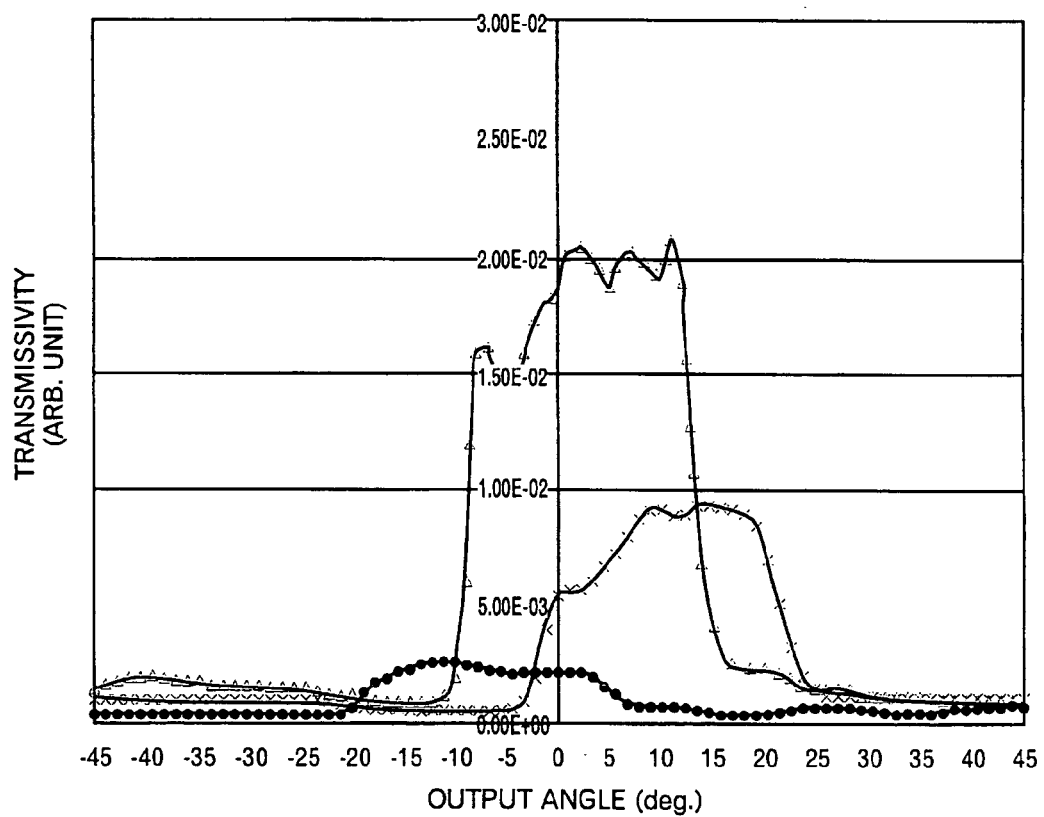
FIGS. 14 to 17 are illustrations showing output light components when an optical device of the present invention is not applied to and is applied to a color-filterless display unit.
Figure 15:
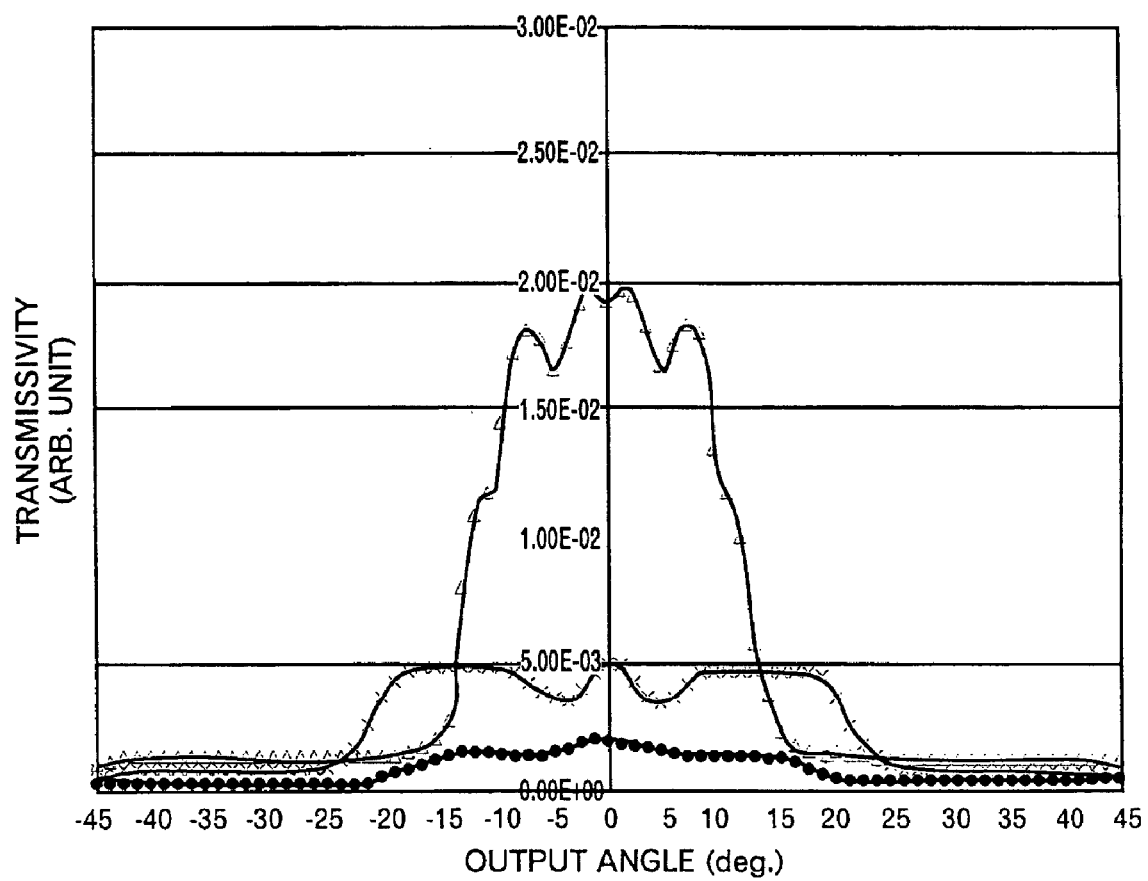
Figure 16:
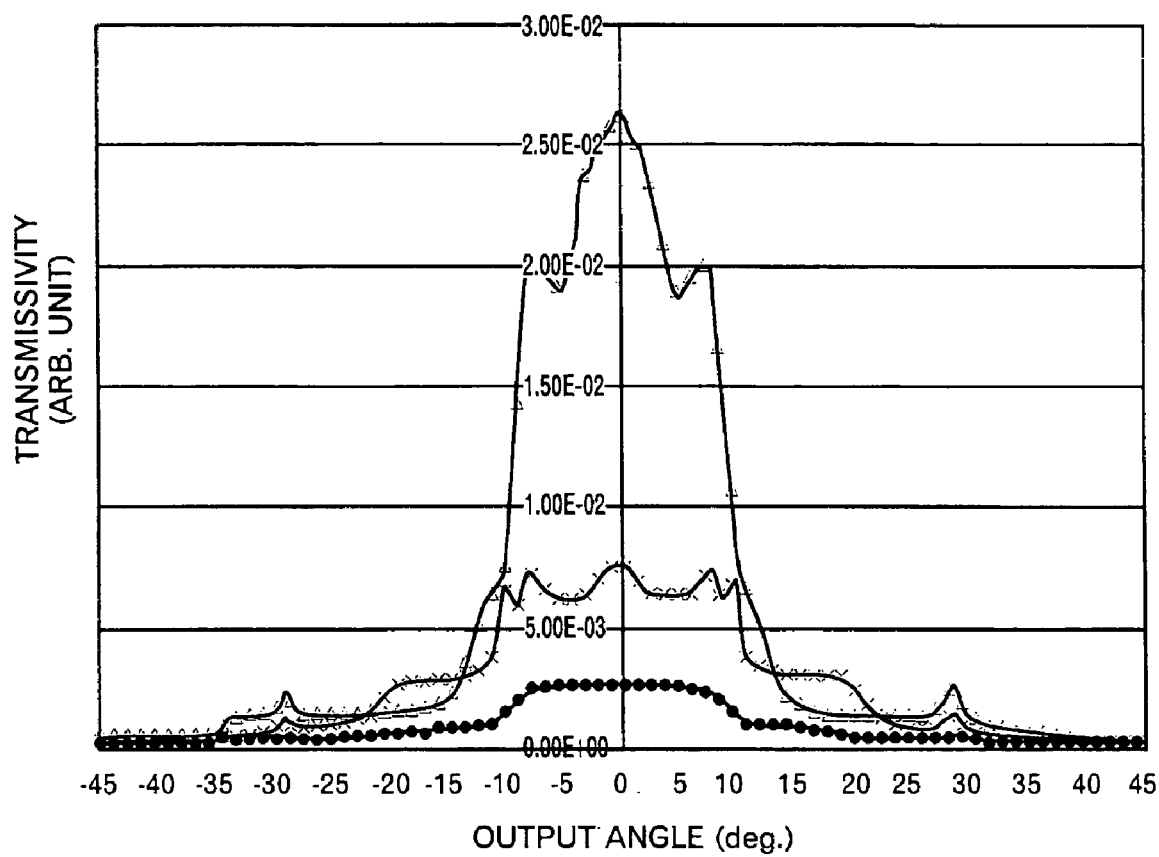
Figure 17:
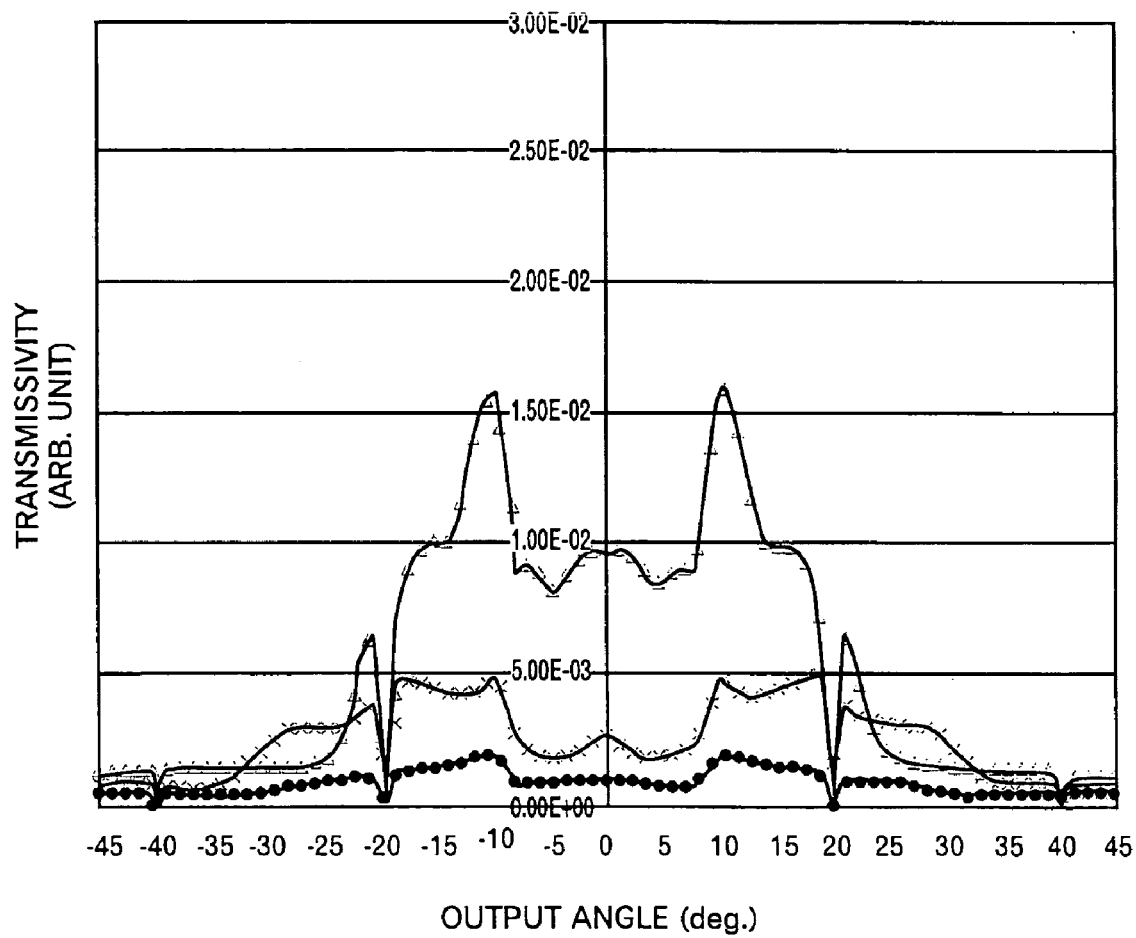

FIGS. 14 to 17 are illustrations showing output light components when an optical device of the present invention is not applied to and it is applied to a color-filterless display unit. FIG. 14 shows an output light distribution when an optical device of the present invention is not used and FIGS. 15 to 17 show output light distributions when performing correction of angle of visibility by using an optical device of the present invention. As optical devices of the present invention, structures of the embodiments shown in FIGS. 2, 4, and 6 are used in order to shown distributions of red light, green light, and blue light. The axis of ordinate shows transmissivity and the axis of abscissa shows angles when assuming the normal direction as 0°. An optical device is used in which the refractive index of a high-refractive-index material is set to 1.55, the refractive index of a low-refractive-index material is set to 1.41, and an aspect ratio is set to 1:12. Moreover, a wavelength of 436 nm shown by a circle denotes blue light, a wavelength of 545 nm shown by a triangle denotes green light, and a wavelength of 612 nm shown by a cross denotes red light. In FIGS. 16 and 17, tilt angles of boundaries are set to constant values of −3° and 3° from the normal direction.

When not using the optical device shown in FIG. 14, lights of three colors have angle distributions different from each other. That is, red light has a peak at an angle of about 10°, green light has a peak at an angle of about 2°, and blue light has a peak at an angle of about −10°. However, when using the optical devices of the present invention shown in FIGS. 15 to 17, three colors are corrected to symmetric distributions centering around an angle of about 0° and overlapped each other. From FIGS. 16 and 17, it is confirmed that a desired front brightness emphasis or diffusion intensity effect is provided with angle correction toward the front direction through discontinuity is present in an output light distribution because tilt angles of boundaries are set to constant values of −3° and 3° from the normal direction.

Moreover, as a result of confirming brightness, the brightness when not using the optical device shown in FIG. 14 is 206 cd/m² but the brightness when applying the optical device of the present invention shown in FIG. 15 is 190 cd/m². Therefore, when applying the optical device of the present invention, it can be found that it is possible to secure a brightness of about 90% also after correction of angle of visibility. When using the above conventional transmission-type diffraction-grating film, the brightness is 85 cd/m² after using the diffraction-grating film though it is 217 cd/m² before using the diffraction-grating film. Therefore, an optical device of the present invention can secure a sufficient brightness. Moreover, in FIG. 16, it is possible to confirm improvement of brightness of 20% or more compared to the case in FIG. 14. Color reproducibility ranges between about 45% and about 60% in the NTSC ratio in the case of the optical devices of the embodiments shown in FIGS. 15 to 17, which exceeds 42% in the case of a 13.3-type color-filter-provided direct-viewing liquid-crystal display unit. Moreover, it is possible to expand a uniform angle of visibility of chromaticity to a range between about −15° and about 15° in FIGS. 15 and 16 and a range between about −20° and 20° in FIG. 17. The present invention makes it possible to further improve a diffusion degree by using a diffusion film together or mixing a diffusion material.

As described above, an optical device of the present invention has a proper aspect ratio so that a high-refractive-index material layer and a low-refractive-index material layer are non-periodically repeated, total reflection occurs at the boundary between the high-refractive-index material and the low-refractive-index material, and angle correction is performed. Therefore, it is possible to obtain an visibility-angle correction effect to an output light distribution centering around the front direction which is the normal direction and improve the front-directional brightness or diffusion degree. Therefore, by applying an optical device of the present invention to a color-filterless display unit, it is possible to arrange rays passing through liquid-crystal cells centering around the front direction and thereby, obtain a clear displayed image in a wide color reproducing range.

By forming an optical device of the present invention into a liquid-crystal cell of a color-filterless liquid-crystal projection apparatus, it is possible to obtain an output light distribution completed in a desired narrow angle range centering around the front direction and improve performances of brightness, chromaticity, and angle of visibility. Moreover, it is possible to convert an output light distribution into a desired distribution by applying the optical device of the present invention to a light source such as a flashlight for illuminating almost the front as a wide-range illumination light source without deteriorating the total quantity of light of the light source or a high-brightness spot illumination light source pinched to the front distance.

Figure 18:
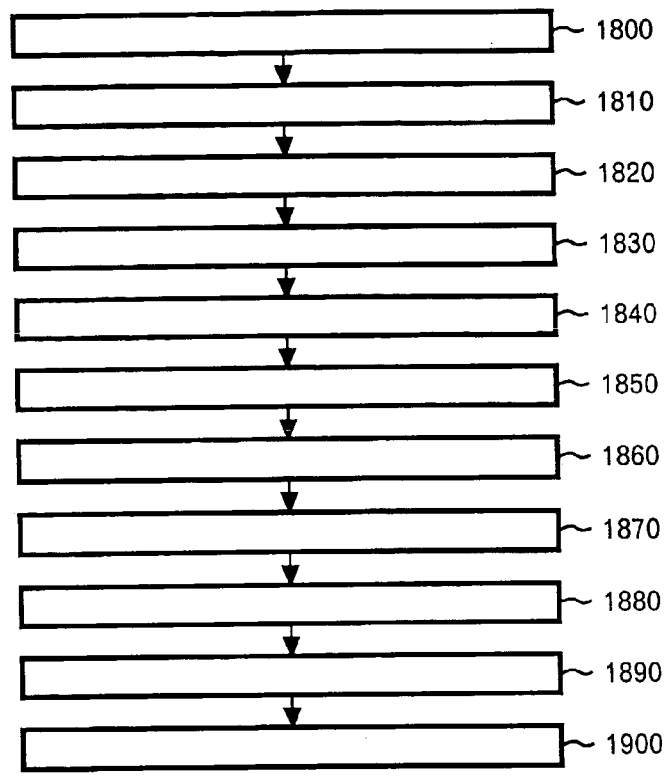
FIG. 18 shows a fabrication process of an optical device of the present invention.

A method for fabricating an optical device of the present invention is described below. FIG. 18 is an illustration showing a fabrication process of an optical device of the present invention. FIG. 18 shows a process for fabricating the optical device by using a high-refractive-index material which is a pipe core material and a low-refractive-index material which is a pipe clad material for surrounding the pipe core material. First, in step 1800, fabrication is started. This step includes a step of preparing materials necessary for fabrication.

Then, as step 1810, a pipe core material is spin-coated to a desired film thickness. A proper thickness is decided as this film thickness in accordance with an aspect ratio. For example, when an aspect ratio is 1:10 and the layer thickness of the pipe core material is 10 μm, the film thickness is decided as 100 μm. The pipe core material can be spin-coated on the surface of a flat proper base material. Not only a spin-coating method but also any other method can be used as long as the method allows the pipe core material to be coated up to a desired thickness.

In step 1820, the pipe core material is heat-treated and cured. In step 1830, the pipe core material is exposed to ultraviolet radiation by using a mask on which a desired pattern is formed. In step 1840, the pipe core material is heat-treated and an exposed desired structure is formed. In step 1850, the structure is developed to melt and remove the pipe core material other than the desired structure. Thereby, a light guide path constituted by the pipe core material having a desired shape is formed. In the case of the present invention, it is possible to use masks in which widths or diameters of light input portions are different from each other so that a non-periodic repetitive structure is obtained. Thereby, it is possible to form layers having different widths, that is, thicknesses, rectangular columns which are not arranged at equal intervals and have different widths, circular cylinders having different diameters, or pillars whose downside and upside are elliptic. In step 1860, rinsing for cleaning a developer is performed and in step 1870, a clad material is injected into a portion removed through developing. After injecting the clad material, the surface is flattened. In step 1880, the clad is cured at room temperature. Then, in step 1890, the clad is heat-treated and completely cured. To avoid sudden structural breakdown, the clad is first naturally cured and then thermally cured. After thermal curing, fabrication of an optical device is completed in step 1900.

It is possible to properly set the above heating temperature and time, developing, and rinsing in accordance with a material used and use any method and liquid conventionally known.

INDUSTRIAL APPLICABILITY

An optical device of the present invention can be applied to various types of lights including a head light as a wide-range illumination light source or high-brightness spot illumination light source pinched to front distance because it is possible to immediately convert the output light distribution of an original light source into a desired distribution without deteriorating the total light quantity of the original light source. Moreover, because an output light distribution completed in a desired narrow angle range in the front direction can be obtained, the optical device is particularly useful to a large color-filterless liquid-crystal projection apparatus.

The invention claimed is:

1. A film-like optical device for angle-correcting light in a predetermined direction, comprising:
    two materials whose refractive index difference is at least 0.1 or over, wherein one material constitutes a plurality of light guide paths having total reflection at the boundary with adjacent other material;
    the light guide paths are formed so that they are not arranged at equal intervals or they have widths or diameters different from each other and the ratio of the width or diameter of the light input portion of each of the light guide paths to the film thickness of the optical device is at least 1:10 or more.

2. The optical device according to claim 1, wherein the boundary tilts from the predetermined direction.

3. The optical device according to claim 1, wherein a plurality of boundaries formed by the light guide paths tilt at a plurality of tilt angles from the predetermined direction correspondingly to an incident angle range of input light.

4. The optical device according to claim 3, wherein the incident angle ranges between −30° and 30° from the predetermined direction in air and the tilt angle ranges between −10° and 10° from the predetermined direction.

5. The optical device according to any one of claim 1, wherein the widths or diameters of the light guide paths are formed so that they are not arranged at equal intervals in a range of 1 to 20 µm.

6. The optical device according to claim 1, wherein a mask is provided in the light input portion of the other material in order to cut off, reflect, or absorb the light inputted to the other material adjacent to the light guide paths.

7. The optical device according to claim 1, wherein the light guide paths are formed as a layer or pillar.

8. The optical device according to any one of claims 1 to 7, wherein the light guide paths are formed so that the area of the light input portion of each of the light guide paths is larger or smaller than the light output portion of each of them.

9. A color display unit comprising:
a light source;
a wedge-shaped light guide plate into which the light emitted from the light source comes;
wavelength dividing means for dividing the light emitted from the wedge-shaped light guide plate into lights in a plurality of wavelength regions;
condensing means for receiving the lights divided by the wavelength dividing means and condensing the light in a predetermined wavelength region to a predetermined subpixel;
a liquid-crystal layer making it possible to control the transmission or cutoff of light every subpixel; and
a film-like optical device for angle-correcting the light emitted from the liquid-crystal layer in a predetermined direction,
wherein the optical device is constituted by two materials whose refraction index difference is at least 0.1 or over and one material constitutes a plurality of light guide paths having total reflection at the boundary with the adjacent other material, and
the light guide paths are formed so that they are not arranged at equal intervals or have widths or diameters different from each other and the ratio of the width or diameter of the light input portion of each of the light guide paths to the film thickness of the optical device is at least 1:10 or more.

10. The color display unit according to claim 9, wherein the boundary tilts from the predetermined direction.

11. The color display unit according to claim 9, wherein a plurality of boundaries formed by the light guide paths tilt at a plurality of tilt angles from the predetermined direction correspondingly to the incident angle range of input light.

12. The color display unit according to claim 11, wherein the incident angle ranges between −30° and 30° from the predetermined direction in air and the tilt angle ranges between −10° and 10° from the predetermined direction.

13. The color display unit according to claim 9, wherein the light guide paths are formed so that widths or diameters of them range between 1 and 20 µm and they are not arranged at equal intervals.

14. The color display unit according to claim 9, wherein a mask is provided in the light input portion of the other material adjacent to the light guide paths in order to cut off, reflect, or absorb the light inputted to the other material.

15. The color display unit according to claim 9, wherein the light guide paths are formed as a layer or pillar.

16. The color display unit according to claim 9, wherein the area of the light input portion of each of the light guide paths is formed so that it is larger or smaller than the area of the light output portion of each of them.

* * * * *

UNITED STATES PATENT AND TRADEMARK OFFICE
CERTIFICATE OF CORRECTION

| | |
|---|---|
| PATENT NO. | : 7,313,309 B2 |
| APPLICATION NO. | : 11/016268 |
| DATED | : December 25, 2007 |
| INVENTOR(S) | : Hidetoshi Numata, Yoichi Taira and Kuniaki Sueoka |

It is certified that error appears in the above-identified patent and that said Letters Patent is hereby corrected as shown below:

Title Page, Item (75) delete "Kuniami" and replace with "Kuniaki"

Signed and Sealed this
Twenty-first Day of August, 2012

David J. Kappos
*Director of the United States Patent and Trademark Office*